(12) United States Patent
Sudoh

(10) Patent No.: US 6,740,149 B2
(45) Date of Patent: May 25, 2004

(54) AIR CLEANER

(75) Inventor: Katsunori Sudoh, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 75 days.

(21) Appl. No.: 09/922,864

(22) Filed: Aug. 7, 2001

(65) Prior Publication Data

US 2003/0029145 A1 Feb. 13, 2003

(30) Foreign Application Priority Data

Aug. 7, 2000 (JP) ........................................ 2000-238455

(51) Int. Cl.⁷ .............................................. B01D 46/00
(52) U.S. Cl. .............................. 96/384; 96/385; 96/386; 96/387; 55/385.3; 55/410; 55/414; 55/493; 55/495; 55/501; 55/503; 55/504; 55/DIG. 37
(58) Field of Search ........................ 55/385.3, 410, 55/413, 414, 418, 490, 493, 495, 501, 503, 504, DIG. 37; 96/384, 385, 386, 387

(56) References Cited

U.S. PATENT DOCUMENTS

| | | | | | |
|---|---|---|---|---|---|
| 1,462,343 A | * | 7/1923 | Jenkins | ............... | 55/DIG. 37 |
| 1,895,642 A | * | 1/1933 | Preble | ............... | 55/493 |
| 2,672,206 A | * | 3/1954 | Keist | ............... | 55/DIG. 37 |
| 3,818,667 A | * | 6/1974 | Wagner | ............... | 55/DIG. 37 |
| 3,862,604 A | * | 1/1975 | Pelabon | ............... | 55/419 |
| 4,319,898 A | * | 3/1982 | Maierhofer | ............... | 55/501 |
| 4,334,899 A | * | 6/1982 | McConnell | ............... | 55/501 |
| 5,573,562 A | * | 11/1996 | Schauwecker et al. | ............... | 55/501 |
| 5,725,622 A | * | 3/1998 | Whitson et al. | ............... | 55/493 |
| 5,863,310 A | * | 1/1999 | Brown et al. | ............... | 55/493 |
| 6,241,794 B1 | * | 6/2001 | Jadran et al. | ............... | 55/490 |
| 6,368,374 B1 | * | 4/2002 | Tokar et al. | ............... | 55/498 |

FOREIGN PATENT DOCUMENTS

JP Y2-591038 0 4/1984

* cited by examiner

Primary Examiner—Duane Smith
Assistant Examiner—Jason M. Greene
(74) Attorney, Agent, or Firm—Birch, Stewart, Kolasch & Birch, LLP

(57) ABSTRACT

To enlarge an opening area in an element retainer supporting a clean side of an element, to reduce resistance to air passage and thereby to enlarge intake air quantity. The interior of an air cleaner is surrounded by a case and a lid is partitioned by an element into a dirty side and a clean side. An opening portion on the side of the clean side of an element holder supporting the element is covered by an element retainer, and the element retainer is formed in the shape of a louver.

21 Claims, 10 Drawing Sheets

AIR CLEANER

CROSS-REFERENCE TO RELATED APPLICATIONS

The present application claims priority under 35 USC 119 to Japanese Patent Application No. 2000-238455 filed on Aug. 7, 2001 the entire contents thereof is hereby incorporated by reference.

BACKGROUND OF THE INVENTION

1. Field of the Invention

The present invention relates to an air cleaner, and particularly to a support structure for an element of the air cleaner.

2. Description of Background Art

Elements for air cleaners hitherto known are generally classified as either cylindrical or flat plate shaped. In the case of supporting a cylindrical element in the interior of an air cleaner, there has been known a structure in which a cylindrical element holder is provided on the side of an air cleaner case, the element holder is provided at its peripheral wall portion with a multiplicity of elongated holes in the shape of slits, and the element is fitted to the outside of the element holder (Japanese Utility Model Publication No. 59-10380 (1984)).

On the other hand, an example of using a flat plate shaped element is shown in FIG. 9. FIG. 10 is a sectional view taken along line 10—10 of FIG. 9. A filter paper 3 is placed in a rectangular element chamber 2 formed at a central portion of an element holder 1, whereby the interior of the air cleaner is partitioned into a dirty side 4 and a clean side 5. The clean side of the element 3 is supported by a rectangular element retainer 6. The element retainer 6 is formed by stacking a punching metal 7 and a wire netting 8, and is fitted to the element holder 1 by small screws 9.

The structure in which elongated holes are provided between the element and the clean side, such as the above-mentioned cylindrical element holder, there is a problem in that the opening area is smaller, so that resistance to air passage is higher, which might hamper an increase in the output of the engine. In addition, the elongated holes barely shut off the noise coming from the engine side, so that intake noise is comparatively large.

On the other hand, in the case of a flat plate shaped element shown in FIGS. 9 and 10, although the element retainer 6 can retain the element 3 formed of a filter paper while securing a certain degree of gas passing property, the punching metal 7 is produced by partially punching a plate-like member to simply form a multiplicity of opening portions and, therefore, there is naturally a limitation as to the magnitude of the opening area, and the rate of opening area is at most about 60%. Therefore, it is difficult to enlarge the amount of air taken into the clean side 5, and there is limitation as to the shut-off of noise, so that the same problems as in the case of the cylindrical element holder are left to be solved.

SUMMARY AND OBJECTS OF THE INVENTION

In order to solve the above-mentioned problems, the air cleaner according to the present invention is an air cleaner comprising an element by which the interior of the air cleaner is partitioned into a dirty side and a clean side, and a gas-passing element retainer provided on the side of the clean side of an element holder for supporting the element, wherein the element retainer is in the shape of a louver comprising a plurality of opening portions and a plurality of rectifier portions projected slantly to the upper side of each of the opening portions.

Since the element retainer for supporting the side of the element facing to the clean side is in the shape of a louver, the opening area can securely be sufficiently large and resistance to air passage can be reduced, as compared to the conventional punching metal. In addition, the resistance to air passage can further be reduced also by a rectifying effect of the rectifier portions of the louver. Moreover, when the rectifier portions are formed to be smooth continuous curved surfaces, the rectifying effect can further be increased. Therefore, resistance to passage of cleaned air taken from the element to the clean side can be reduced, so that the amount of air taken in can be increased, which can contribute to enhancement of the output of the engine.

Furthermore, since the rectifier portions of the louver project at a slant to the upper side of the opening portions, the passages of air passing through the opening portions and communicating between the engine side and the element side are bent at the rectifier portions, so that the noise coming from the engine side can be effectively shut off. Therefore, the amount of noise transmitted through the element to the dirty room side can be reduced, resulting in that intake noise can be effectively reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
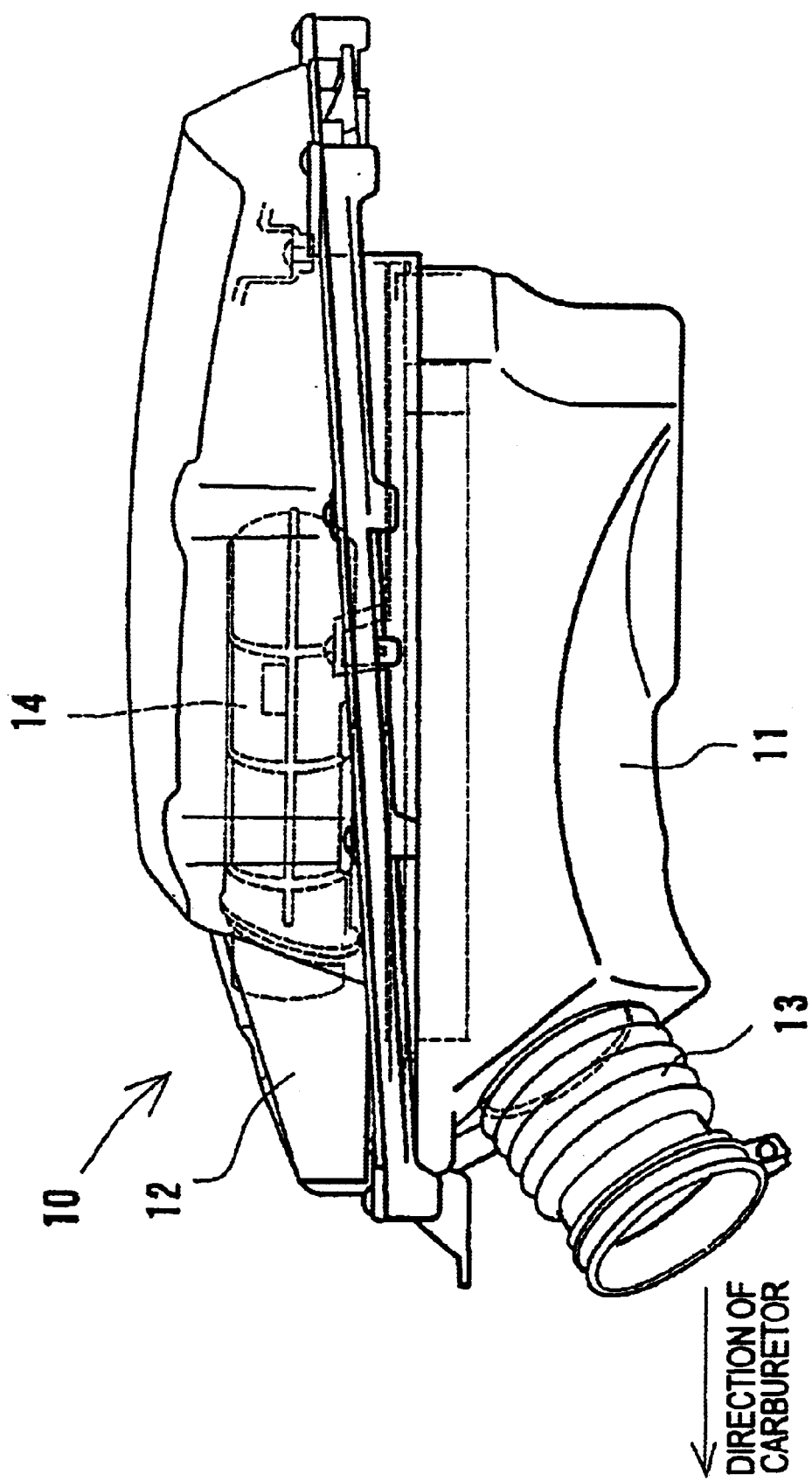
FIG. 1 is a perspective view of an air cleaner to which the first embodiment is applied.

Now, embodiments shown in the drawings will be described. First, the total structure of the air cleaner will be described referring to FIGS. 1 and 2. The air cleaner 10 comprises a case 11 and a lid 12 covering an opening portion of the case 11, and a connecting tube 13 extends from the case 11 and is connected at a distal end to a carburetor (not shown). A duct 14 is provided in the inside of a lower portion on the side of the lid 12, to take in outside air through an inlet opened to the front side of the vehicle body.

Figure 2:
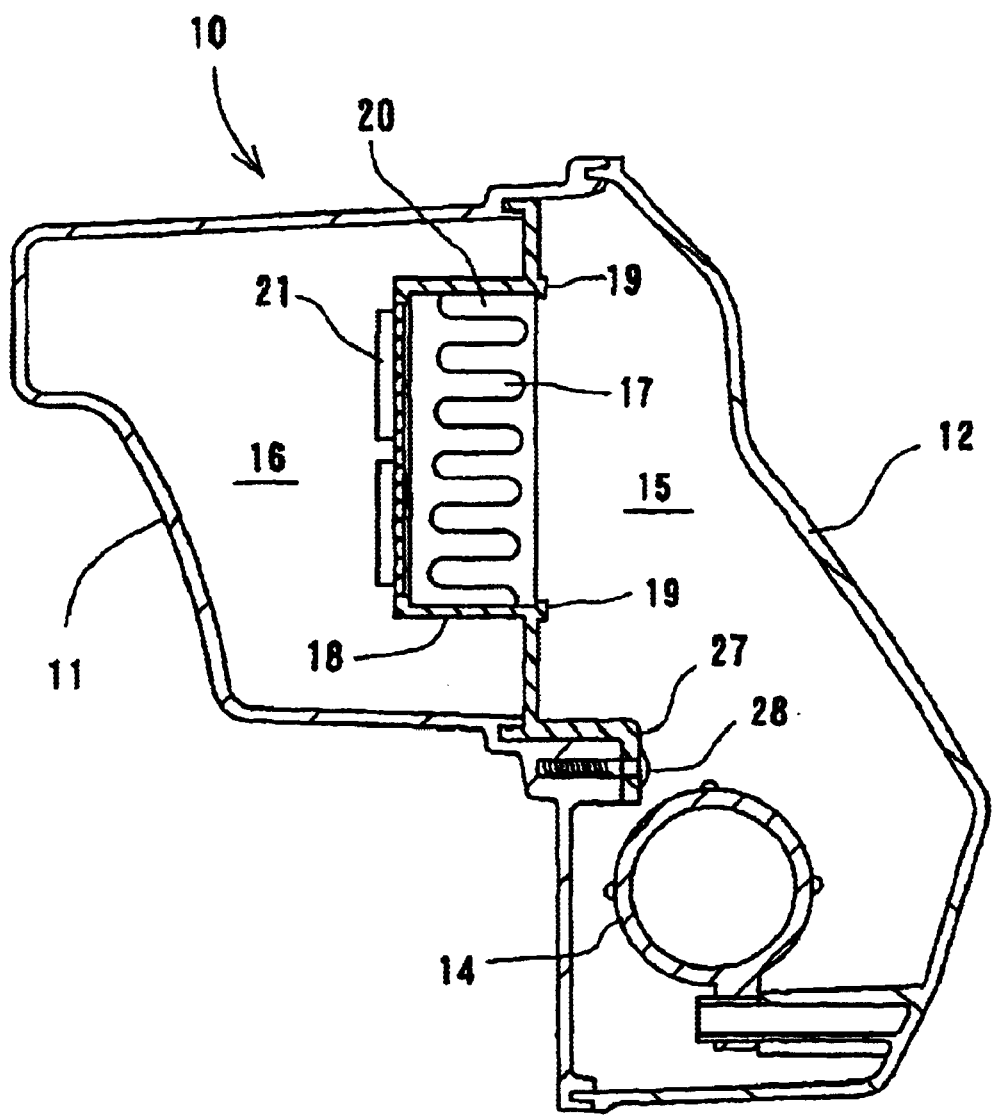
FIG. 2 is a sectional view taken along line 2—2 of FIG. 1.

As is clearly shown in FIG. 2, the interior of the air cleaner 10 is partitioned by an element 17 into a dirty side 15 on the side of the lid 12 and a clean side 16 on the side of the case 11. The element 17 is a roughly a flat plate shaped member consisting of a filter paper, and is supported on the case 11 by an element holder 18.

The element holder 18 is formed of an appropriate material such as resin, a rectangular element chamber 20 projects to the side of the clean side 16 and is provided at a central portion of the element holder 18. The element 17 is contained in the element chamber 20. The element chamber 20 is opened to both the dirty side 15 and the clean side 16. The element holder 18 is provided at its lower end portion with a stay 27, which is fixed to the case 11 by a tapping screw 28 on the side of an opening portion opened toward the lid 12.

The surface of the element 17 on the side of the dirty side 15 is prevented from dropping off by a flange 19 formed as one body with the element holder 18. On the other hand, the surface of the element 17 on the side of the clean side 16 is supported by an element retainer 21 formed from an appropriate metallic plate by press forming or another appropriate method or from an appropriate resin material by an appropriate molding method.

Figure 3:
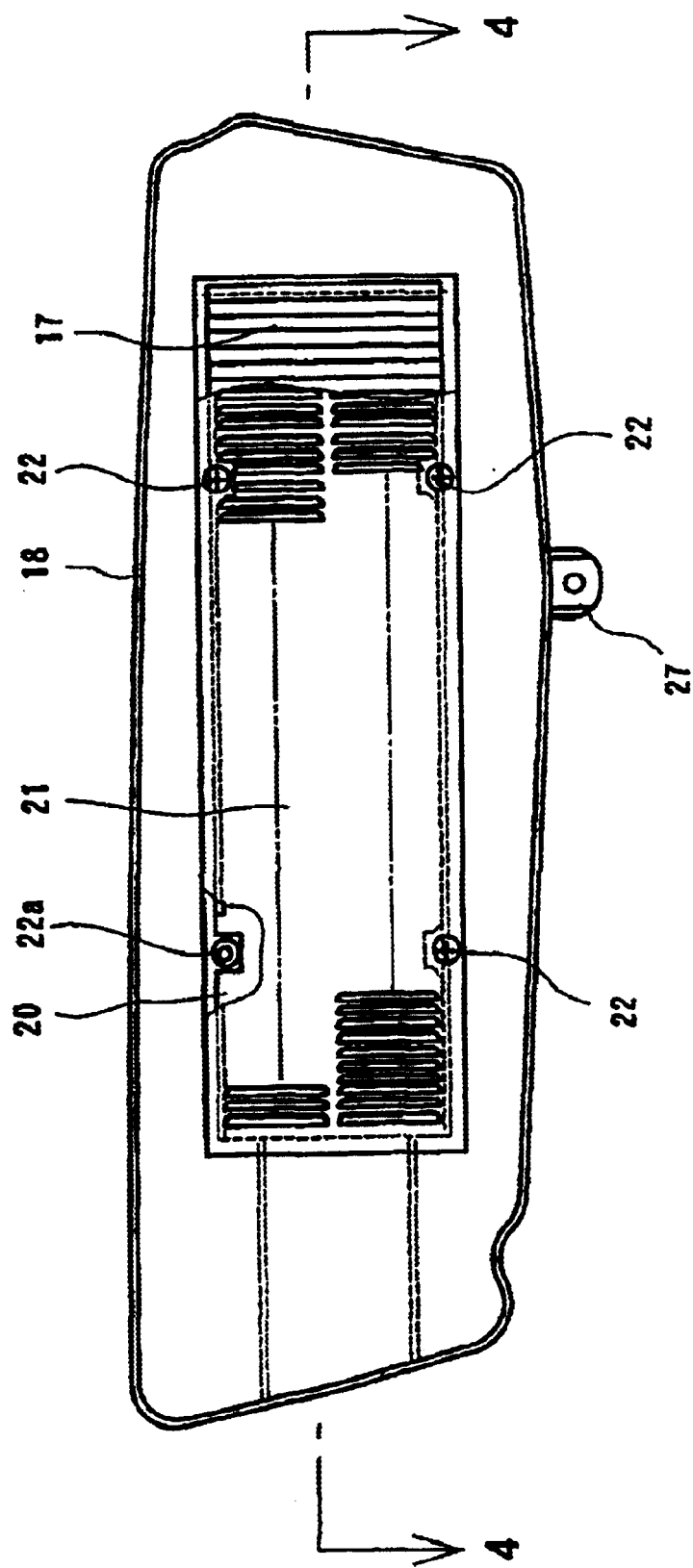
FIG. 3 is a perspective view of an element retainer.
Figure 4:
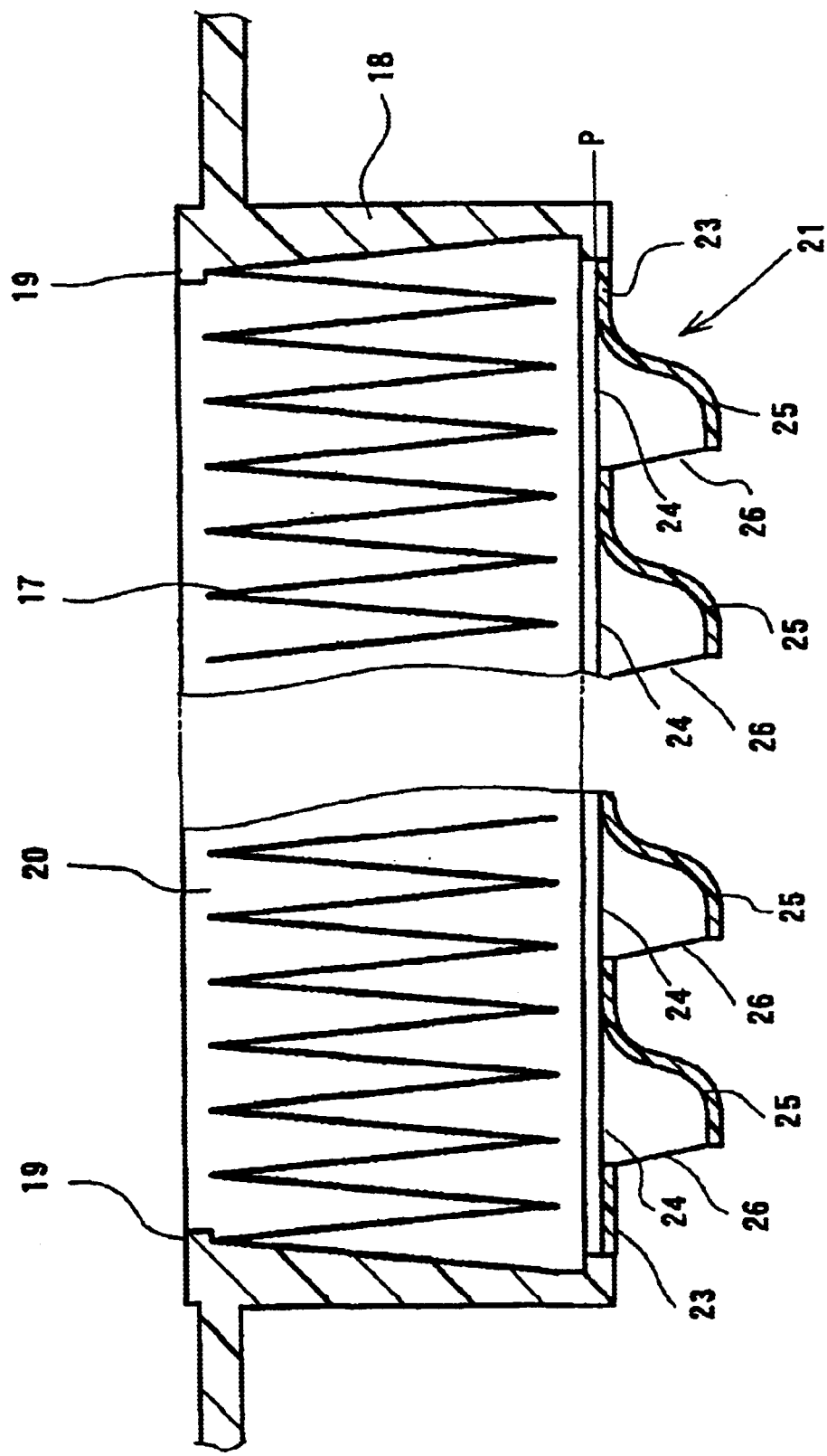
FIG. 4 is a sectional view taken along line 4—4 of FIG. 3.

The element retainer 21 is rectangular in shape as shown in FIG. 3, and a plurality of side edge portions thereof are fitted to an opening edge portion of the element chamber 20 on the side of the clean side 16 by small screws 22. The symbol 22a in the figure denotes a boss provided on the side of the element chamber 20, holes 22b (FIG. 5) provided at edge portions of the element retainer 21 are brought into register with the bosses 22a, and the element retainer 21 is fastened by the small screws 22.

Figure 5:
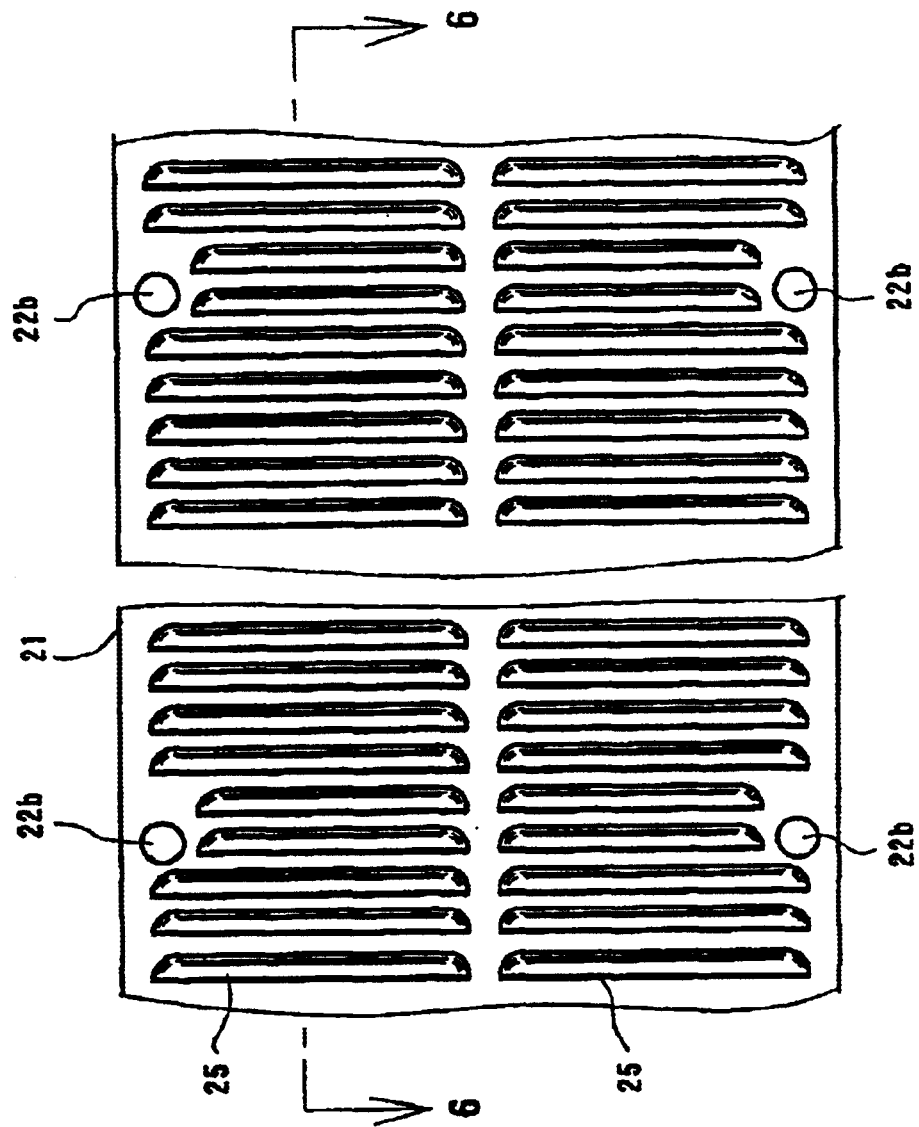
FIG. 5 is an enlarged view showing a part of the element retainer.
Figure 6:
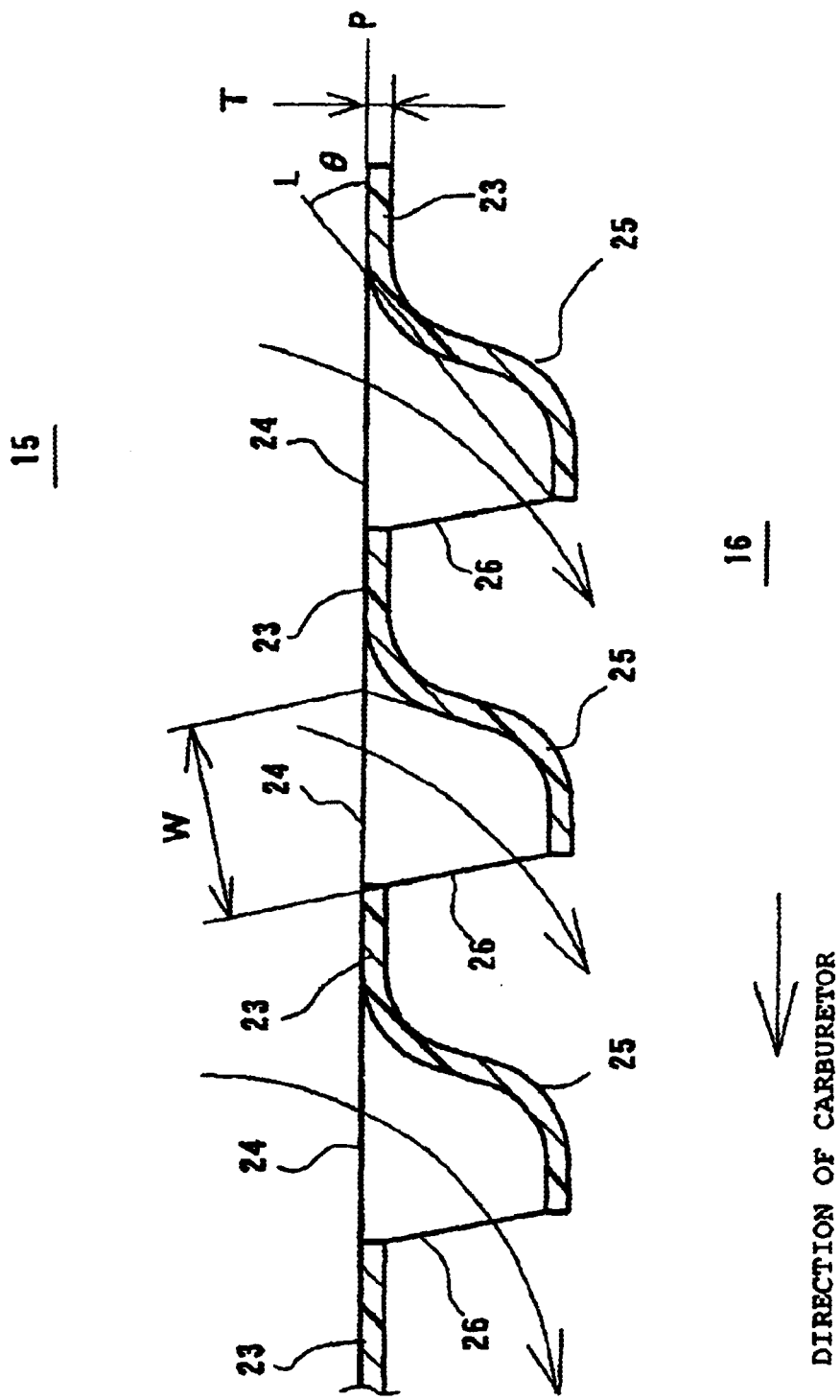
FIG. 6 is a sectional view taken along line 6—6 of FIG. 5.

As shown in FIG. 5 which is an enlarged view showing the element retainer 21 and FIG. 6 which is a sectional view thereof, the element retainer 21 is in the shape of a louver. Namely, a base portion 23 in a flat surface shape is provided with a plurality of base portion side opening portions 24 formed in an elongated hole shape and parallel to each other, and inclined portions 25 are formed so as to cover the upper side of each of the base portion side opening portions 24.

Each of the inclined portions 25 projects from and is integral with an opening edge portion of a corresponding one of the base portion side opening portions 24. The inclined portion 25 is in the shape of a smoothly continuous curved surface, and is a specific embodiment of a rectifier portion in the present invention, and the tip end side thereof undergoes a change in direction of about 90° to be a tip end side opening portion 26.

Therefore, the base portion side opening portion 24 and the tip end side opening portion 26 have opening directions differing by about 90°, and an air passage connecting between both the opening portions is bent in the shape of a smoothly continuous curved line. As is clear from FIG. 6, there is set a relationship of:

$$T \times 4 \leq W \quad (1)$$

where T is the plate thickness of the element retainer 21, and W is the width of linear connection from the base portion side opening portion 24 to the tip end side opening portion 26 of the inclined portion 25.

Where the plane assumed to contain each fitting portion of the element retainer 21 is referred to as a fitting plane P, the inclined portion 25 as a whole is inclined with respect to the fitting plane P. The fitting plane P is substantially the same as the plane surface of the base portions 23 of the element retainer 21. In one inclined portion 25, the line segment L connecting between the portion of the tip end side opening portion 26 farthest from the base portion 23 and a base portion of the inclined portion 25 in the base portion side opening portion 24 is inclined by $\theta$ with respect to the fitting plane (plane of the base portions 23) P.

Next, the effects of the present embodiment will be described. When clean air cleaned by passing from the dirty side 15 through the element 17 flows into the clean side 16, the clean air changes its stream line direction by about 90° while being rectified by the curved surfaces of the inclined portions 25, and flows into the clean side 16 as shown by the arrows in FIG. 6. At this time, resistance to air passage is reduced by the rectifying effect of the inclined portions 25. Moreover, with the tip end opening portions 26 directed to the intake downstream side, namely, to the side of a carburetor, the flow of intake air is still further made smooth.

In addition, with the element retainer 21 formed in the shape of a louver, the opening area can be markedly enlarged as compared with a simple punching of the metal. Therefore, resistance to air passage is reduced, and a larger quantity of intake air can be secured, which can contribute to enhancement of output of the engine.

Moreover, since the upper side of the base portion side opening portions 24 are covered by the inclined portions 25, the noise coming from the engine side can be shut off, and the amount of noise transmitted to the side of the dirty side 15 can be reduced. Where the width W of the inclined portions 25 is in the relationship of (1) above-mentioned, the rectifying effect for intake air and the shutting-off effect for the noise coming from the engine side can be displayed simultaneously and effectively.

Figure 7:
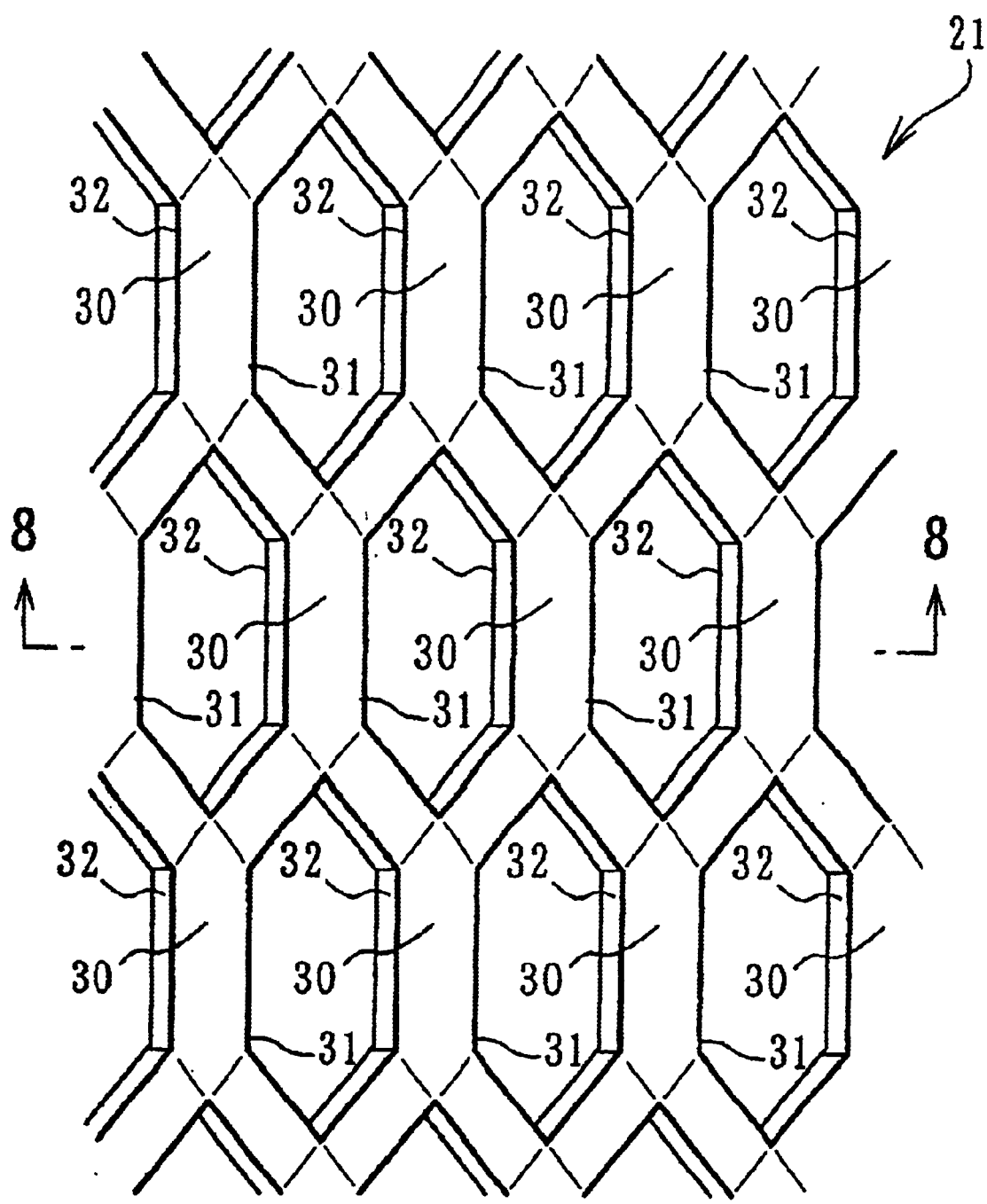
FIG. 7 is a view showing a part of an element retainer according to a second embodiment.
Figure 8:
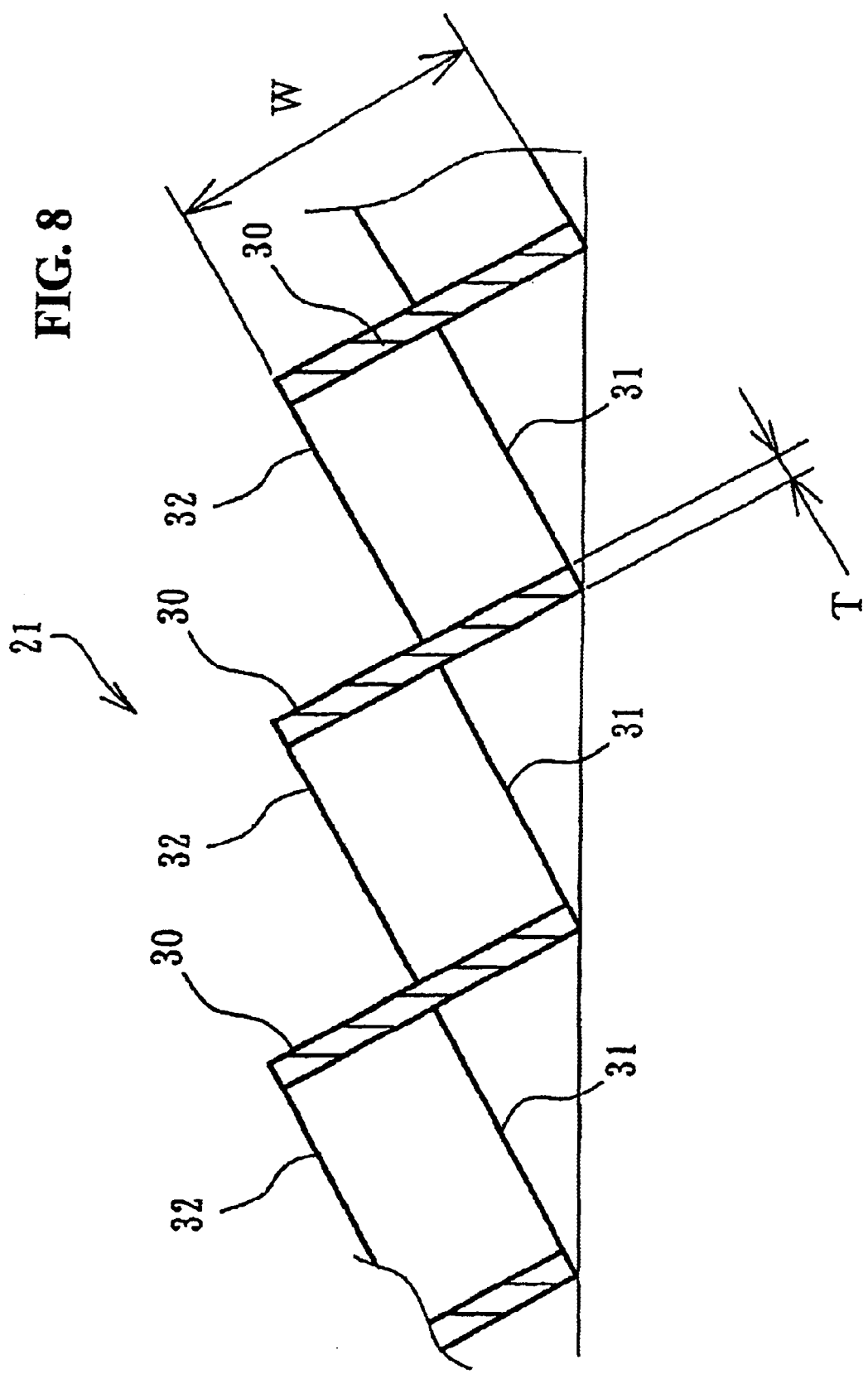
FIG. 8 is a sectional view taken along line 8—8 of FIG. 7.
Figure 9:
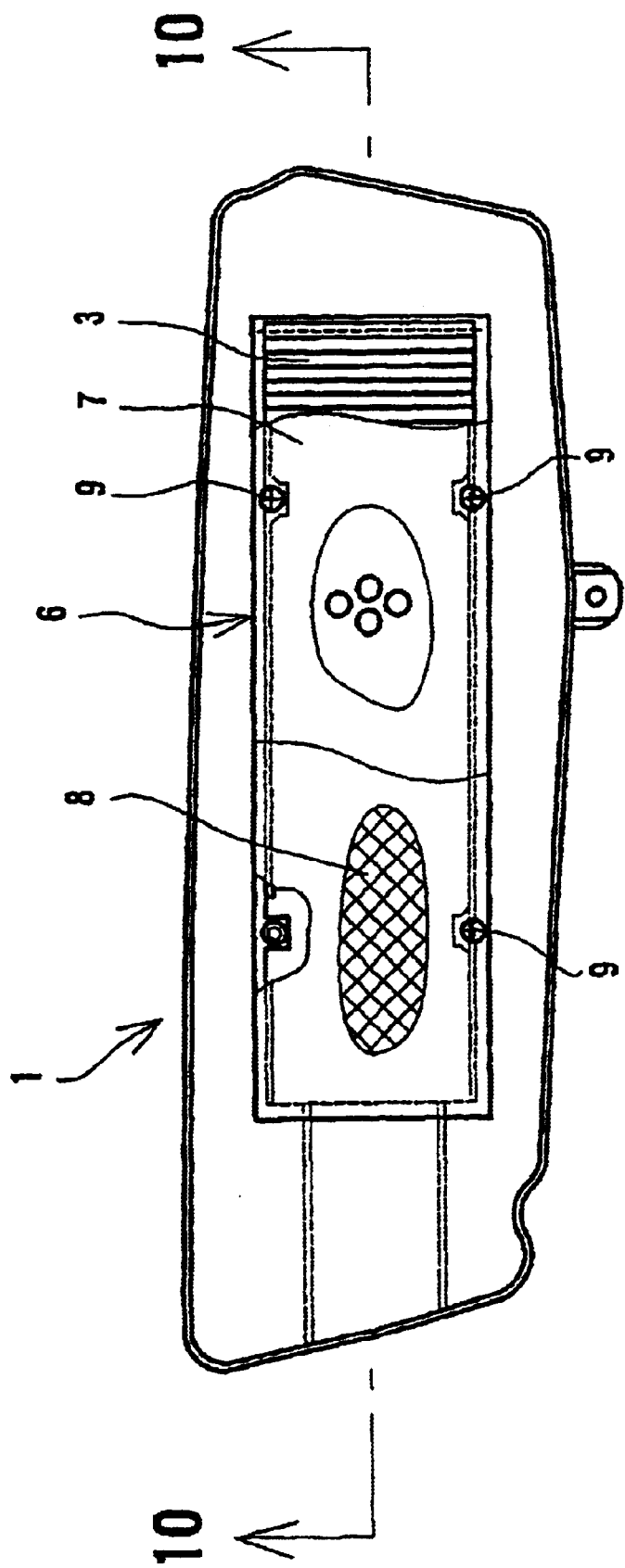
FIG. 9 is a view showing an element and an element holder according to the prior art.
Figure 10:
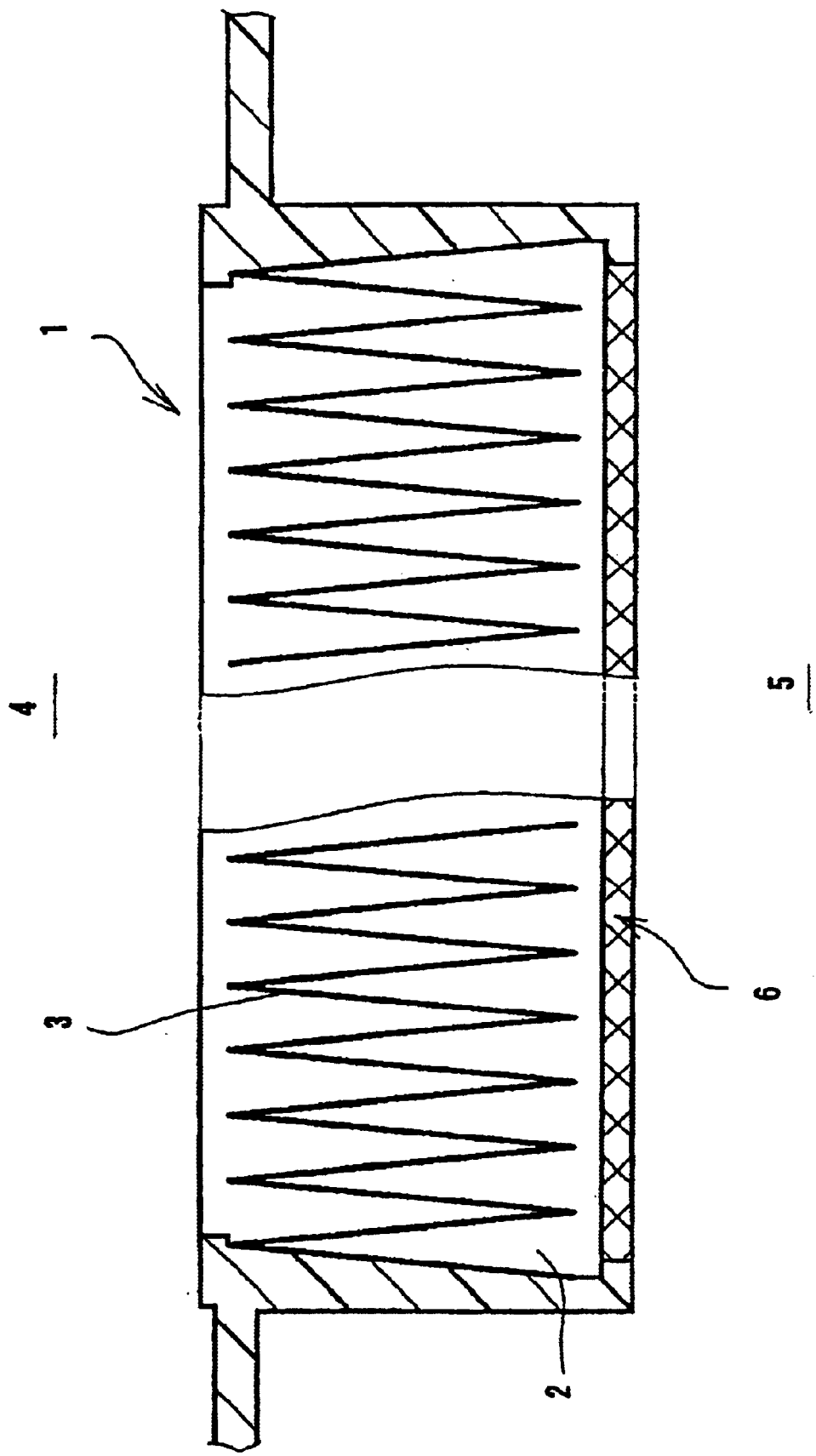
FIG. 10 is a sectional view taken along line 10—10 of FIG. 9.

FIG. 7 shows an example of composing the element retainer 21 of an expanded metal as a second embodiment. FIG. 8 is a sectional view taken along line 8—8 of FIG. 7. As is clear from FIGS. 7 and 8, a multiplicity of roughly hexagonal frame portions 30 are provided in continuation, and as is clear from FIG. 8, the frame portions 30 are inclined at an appropriate angle with respect to the fitting plane P, and constitute another example of the rectifying portions in the present invention. In addition, corresponding portions of the frame portions 30 that are adjacent to each other are respectively parallel with each other.

In this example, also, since the base portion side opening portion 31 on the dirty side 15 and the tip end side opening portion 32 on the clean side 16 are staggered from each other, as viewed in the direction orthogonal to the fitting plane P, the air passage connecting between the side of the element 17 and the clean side 16 is bent. The width W of the frame portion 30 from the base portion side opening portion 31 to the tip end side opening portion 32 is in the relationship of (1) above with the plate thickness T, in the same manner as the previous embodiment. In such an arrangement, also, the frame portions 30 function in the same manner as the inclined portions 25 in the previous embodiment, and the same effects as in the previous embodiment can be obtained so as to secure a sufficient opening area, rectification, and provide for a shut-off of noise.

The present invention is not limited to or by the above embodiments, and various applications and modifications can be made. For example, the element retainer may be cylindrical in shape, to function also as a cylindrical element holder. The shape of the louver in the present invention only needs a plurality of opening portions and inclined portions provided correspondingly to each of the opening portions and projecting to the upper side of the opening portions; the adjacent ones of the inclined portions are not necessarily of the same shape or parallel to each other.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air cleaner comprising:
    a housing forming an interior area, said housing including a case and a lid, an element holder being mounted on the case and being enclosed by the case and the lid;
    an element for partitioning the interior area of said housing into a dirty side and a clean side; and
    a gas-passing element retainer provided on the clean side of an element holder for supporting, said element said element retainer having the shape of a louver comprising a plurality of opening portions and a plurality of rectifier portions projecting at a slant to an upper side of each of said opening portions.

2. The air cleaner according to claim 1, wherein said louver is formed by a plurality of inclined portions that extend from a base portion forming the opening portions in said element retainer for directing air from the gas-passing element retainer.

3. The air cleaner according to claim 1, wherein said rectifier portions are formed by smoothly, continuously curved surfaces extending from a base portion of said element retainer.

4. The air cleaner according to claim 2, wherein said opening portions in said element retainer extend in a first direction, and tip end side openings exiting from said inclined portions extend in a second direction displaced relative to said first direction.

5. The air cleaner according to claim 4, wherein said tip end side opening portions are displaced approximately 90° relative to the opening portions in said element retainer.

6. The air cleaner according to claim 2, wherein said plurality of inclined portions cover said opening portions in said element retainer for reducing the noise from an engine side of said air cleaner.

7. The air cleaner according to claim 1, wherein said element holder includes a stay position at one end for mounting said element holder relative to said case, the stay being covered by the lid.

8. The air cleaner according to claim 7, wherein said element holder includes a flange for retaining said element relative to said element holder.

9. The air cleaner according to claim 1, wherein said element is a filter.

10. An air cleaner comprising:
    a housing forming an interior area, the housing including a case and a lid, an element holder being mounted on the case and being enclosed by the case and the lid;
    a retainer for partitioning the interior area of said housing into a dirty side and a clean side; and
    a filter mounted relative to said retainer for cleaning air flowing from said dirty side of said retainer to said clean side, said retainer being a louver including a plurality of opening portions and a plurality of rectifier portions projecting at a slant relative to said element holder.

11. The air cleaner according to claim 10, wherein said louver is formed by a plurality of inclined portions that extend from a base portion forming the opening portions in said retainer for directing air from the retainer.

12. The air cleaner according to claim 10, wherein said rectifier portions are formed by smooth, continuously curved surfaces extending from a base portion of said retainer.

13. The air cleaner according to claim 11, wherein said opening portions in said retainer extend in a first direction and tip end side openings exiting from said inclined portions extend in a second direction displaced relative to said first direction.

14. The air cleaner according to claim 13, wherein said tip end side opening portions are displaced approximately 90° relative to the opening portions in said retainer.

15. The air cleaner according to claim 11, wherein said plurality of inclined portions cover said opening portions in said retainer for reducing the noise from an engine side of said air cleaner.

16. The air cleaner according to claim 10, wherein said louver includes a plurality of substantially hexagonal frame portions that are inclined at a predetermined angle with respect to a base of said element holder.

17. The air cleaner according to claim 10, wherein said element holder includes a stay positioned at one end for mounting said element holder relative to said case, the stay being covered by the lid.

18. The air cleaner according to claim 17, wherein said element holder includes a flange for retaining said filter relative to said element holder.

19. The air cleaner according to claim 1, wherein the lid bulges upwardly from the retainer for enclosing a duct, the duct taking in outside air.

20. The air cleaner according to claim 10, wherein one side of the lid is disposed above the case, and another side of the lid bulges and extends outwardly from the case to enclose a duct that takes in outside air.

21. The air cleaner according to claim 1, further comprising a connecting tube extending from the case and connected at its extended end to a carburetor, wherein said louver includes tip end side opening portions directed to the carburetor on an intake downstream side of the connecting tube.

* * * * *